Figure 1:
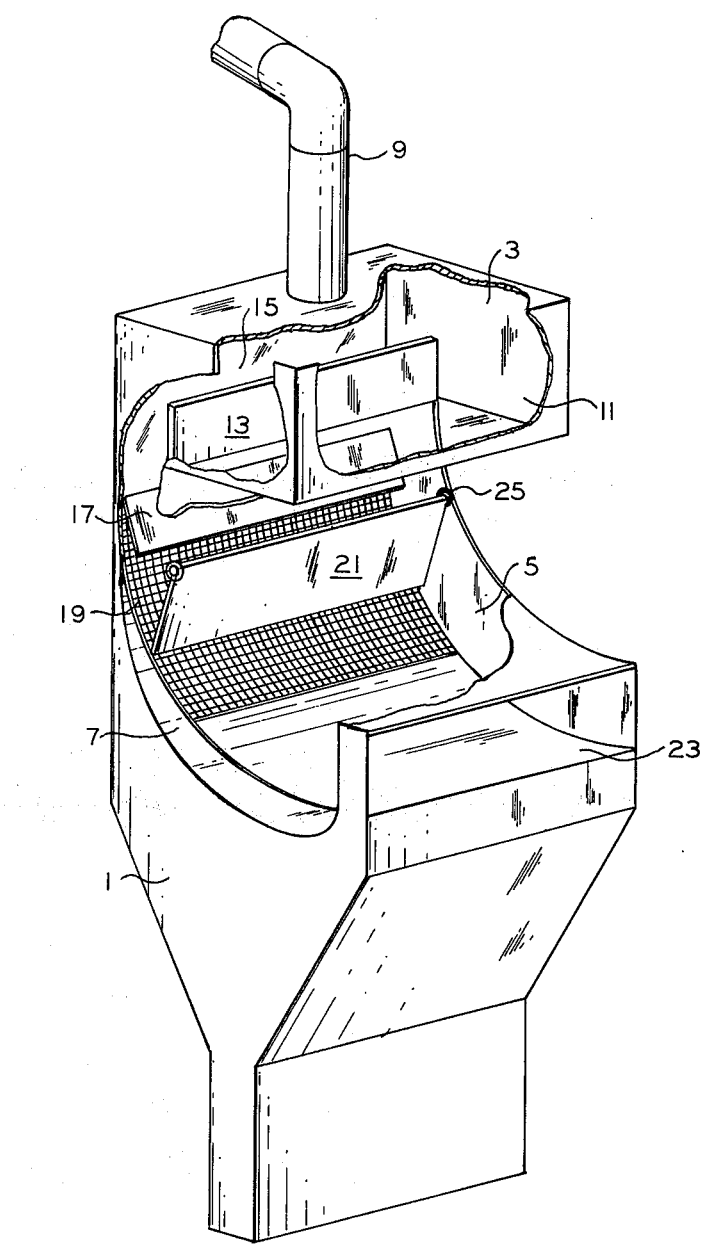

United States Patent [19]

Tinker et al.

[11] 4,120,790
[45] Oct. 17, 1978

[54] SYNTHETIC RUBBER DEWATERING APPARATUS AND METHOD

[75] Inventors: Donald Tinker, Bonnet Bay; Keith E. Berg, Lurnia, both of Australia

[73] Assignee: Phillips Petroleum Company, Bartlesville, Okla.

[21] Appl. No.: 810,836

[22] Filed: Jun. 28, 1977

[51] Int. Cl.² ............................................. B01D 25/04
[52] U.S. Cl. .................................... 210/65; 209/258; 209/267; 209/281; 210/247; 210/355; 210/358; 210/409; 210/420; 210/456
[58] Field of Search ................. 210/65, 152, 153, 154, 210/163, 244, 245, 294, 295, 305, 306, 423, 424, 425, 456, 464, 473, 247, 354, 355, 358, 409, 418, 420, 421; 209/240, 250, 255, 258, 267, 281, 254

[56] References Cited

U.S. PATENT DOCUMENTS

| | | | |
|---|---|---|---|
| 786,184 | 3/1905 | Benefield | 209/281 |
| 1,360,834 | 11/1920 | Wallace et al. | 209/250 |
| 2,090,997 | 8/1937 | French | 209/281 |
| 2,872,041 | 2/1959 | Fontein et al. | 209/281 |
| 3,206,396 | 9/1965 | Davis | 209/281 |
| 3,239,943 | 3/1966 | Davis | 209/281 |
| 3,259,244 | 7/1966 | Kaljo et al. | 209/240 |
| 3,452,876 | 7/1969 | Ginaven | 209/281 |

OTHER PUBLICATIONS

"Line Tanks With", E. C. Fetter, Chemical Engineering, Nov. 1949.

Primary Examiner—Frank Sever

[57] ABSTRACT

An apparatus and method for dewatering rubber crumb in which a slurry of rubber crumb and fines overflowed from a feed tank onto a curved screen for dewatering is subjected to a change in direction away from the screen by a fixed baffle in the feed path upstream of the screen and is then redirected by a second, adjustable baffle onto the screen with the second, adjustable baffle also determining the spacing between the screen and the second baffle and thereby restricting flow from the curved screen onto a coated chute which delivers partially dewatered rubber crumb from the apparatus.

8 Claims, 2 Drawing Figures

SYNTHETIC RUBBER DEWATERING APPARATUS AND METHOD

BACKGROUND OF THE INVENTION

This invention relates to the removal of moisture from a rubbery polymer while in crumb form. In one of its aspects this invention relates to a method for directing a water slurry of rubber crumb across a static screen for controlled dewatering. In another of its aspects this invention relates to an apparatus containing means for the controlled dewatering of rubber crumb.

Many types of rubber are dried in the form of a crumb or sheet. Most crumb drying systems make use of shaker screens to remove the water from the crumb. Dependence on a shaker screen system for removal of the majority of the water, however, can lead to excessive losses of fines material or excessive recycle of fines material within the system. Static dewaterers are, therefore, often used in conjunction with other dewatering equipment.

Control of flow of crumb across the screen of a static dewatering device can be a problem. Excessive impact of the crumb on the screen can plug the screen and improper control of the flow of crumb across the screen can result in removal of too much or too little of the water from the crumb to prepare it properly for the remainder of the drying system. It has now been found that by using a combination of a fixed and an adjustable baffle in the flow path of crumb slurry directed onto a static dewatering screen good control can be obtained of the amount of water removed from the crumb and the problem of plugging the screen can be minimized.

It is therefore an object of this invention to provide a method for dewatering rubber crumb. It is another object of this invention to provide an apparatus for dewatering rubber crumb. It is still another object of this invention to reduce the loss of fines material from a dewatering system for rubber crumb. It is still another object of the invention to provide means by which the flow of wet crumb from the static dewatering screen can be controlled.

Other aspects, objects, and the various advantages of this invention will become obvious upon study of this specification, the drawings, and the appended claims.

STATEMENT OF THE INVENTION

According to this invention an apparatus for removing water from rubber crumb is provided. The apparatus is made up of concave surfaced bartype screen sloped downward and attached to a chute leading away from the screen. Inlet means for directing rubber crumb slurry downward toward the screen is terminated in the first baffle fixed in relation to the inlet means and the screen so that inlet flow is directed away from the screen toward a second baffle which is adjustable in its relationship with the fixed baffle and the screen both to redirect flow from the first baffle onto the screen and to limit the spacing between the screen and the second baffle so that flow from the screen surface onto the chute can be restricted.

Preferably, the screen, the chute and the baffles are contained within a housing that prevents loss of water and rubber crumb by splashing out of the system, with the housing also directing water and fines that pass through the screen into a collecting means from which they can be continuously removed for recycle or disposal. Most preferably, the housing also contains as an inlet means for crumb slurry a head tank positioned above the static screen which consists of a weired chamber into which crumb slurry is discharged from a transfer line with overflow of the weir directed against the fixed baffle as feed to the static dewatering apparatus.

In an embodiment of this invention a method for removing water from water crumb slurry is provided in which the slurry is directed downward toward a concave surface bar-type screen but is deflected away from the screen by a fixed baffle which directs the flow toward the face of a second baffle which can be adjusted to redirect the flow onto the screen and to limit the spacing between the screen and the second baffle thereby restricting flow along the screen surface.

Although any type screen that is suitably sized for retaining rubber crumb on its surface while passing water through the screen without easily becoming clogged with crumb is suitable for use in this invention, it has been determined experimentally that a bar-type screen which utilizes openings that are larger on the underside than on the inlet side is well suited for the concave surface preferred for moving the slurry with greatest ease across the screen. The concave surface allows the use of gravity and the fluidity of the wet crumb to be sufficient motive force to carry the crumb rubber across the screen and onto the discharge chute from the static dewaterer.

The discharge chute can be made of any smooth, nonsticking material. It is presently preferred that the discharge chute be coated with a material, such a polytetrafluoroethylene or poly(arylene sulfide), which is known to give added "slickness" or nonstick characteristics to a surface.

It has been determined that the angle of the fixed baffle in relation to the inlet flow of crumb slurry is not particularly critical. Any angle of less than 180° will have the effect of deflecting flow away from the screen. Angles between about 110° and about 160° have been found practical with an angle of about 130° to about 160° being preferred.

The second baffle is hung vertically, pivoted at its top with means for adjusting the angle and locking the baffle in place. The adjustable baffle is sized so that it can be swung into a minimal clearance with the screen and is placed in relationship with the fixed baffle so that at least some slurry impinges upon the face of the second baffle at operating flows.

The head tank that is preferred as a means for introducing crumb slurry into the static dewatering screen system is an apparatus of the type described as a feeder in U.S. Pat. No. 3,206,396. The head tank can be made as part of the same structure as the housing that prevents flashing of slurry or wet crumb from this apparatus.

Figure 2:
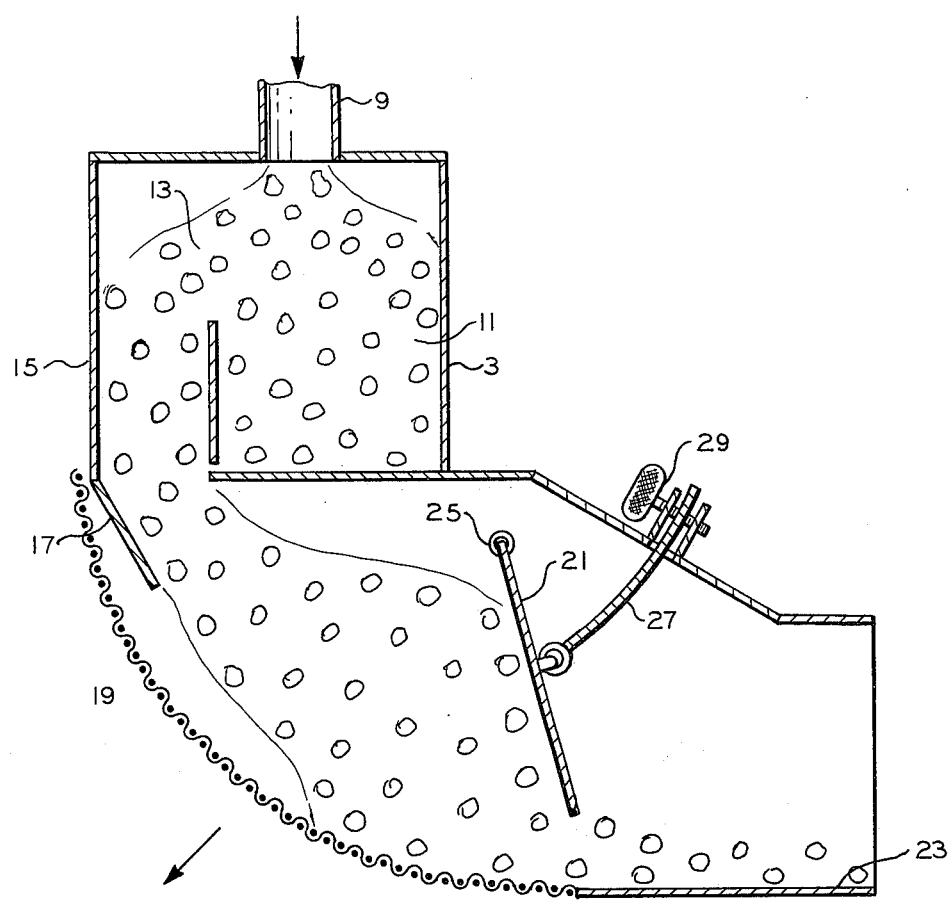

The apparatus and its operation is best described in conjunction with the drawing in which FIG. 1 is a partially cut away perspective view of the apparatus, and FIG. 2 is a line drawing side view of the functioning part of the apparatus.

Referring now to FIG. 1 an embodiment of the apparatus can be envisioned as a housed structure 1 which can be divided into a feed tank section 3, a dewatering section 5 and a water collecting and removal section 7.

The feed tank section 3 is shown in relation to a slurry delivery pipe 9 and consists of a chamber 11 made by the sidewalls and a weir 13 into which the rubber crumb slurry is delivered with overflow over weir 13 into a vertical delivery section 15 which acts as the inlet means to the screening section 5.

The dewatering section is made up of the first fixed baffle 17, the concave surfaced screen 19, the second adjustable baffle 21 and the exit chute 23 all contained within housing 1.

The area beneath the screen 19 enclosed within the housing 1 defines the water collecting and removal section 7. This is simply described as an enclosure in which the water and fines passing through screen 19 are contained with an outlet for removal, preferably by gravity, to disposal or to recycle.

Referring now to FIG. 2 the operation of the flow control means in the screening system can be explained. Slurry enters through delivery pipe 9 into the chamber 11 from which it overflows weir 13 into the vertical delivery section 15. The slurry moving down the vertical inlet means encounters the first, fixed baffle 17 and is diverted away from the screen 19 toward the second, adjustable baffle 21. The second baffle 21 rotates around pivot 25 and can be moved to the desired position by moving perforated bar 27 which is locked in position with pin 29. The second baffle 21 usually is operated in conjunction with a flow control valve (not shown) in line 9 admitting slurry to the overflow chamber 11. The flow control valve regulates slurry inlet into the dewatering device and the second baffle controls flow of crumb out of the dewatering device thereby controlling the amount of water passing through the screen.

In reiteration, first baffle 17 is not adjustable. It directs the whole flow away from the screen element 19 as the crumb slurry leaves the head tank 3 thereby reducing impact of the slurry on the screen. The second baffle 21 is adjustable. Its purpose is to catch part of the flow and direct it onto the screen 19 for dewatering. By setting the second baffle 21, very fine adjustments can be made to the amount of water leaving the apparatus with the crumb. It has been found that the best mode for adjusting the baffle is to cut back the amount of water flow from the apparatus until the crumb just starts to build up on the outlet chute 23 and then to open baffle 21 one extra notch on perforated bar 27. This will retain enough water in the crumb to assure adequate flow characteristics to the crumb on the outlet chute. In this way it is not necessary to add extra water to the crumb on outlet chute 23 to get the crumb to flow properly. It has been found that baffle 21 can be easily adjusted to suit the prevailing operating conditions both upstream as related to the amount of water in the slurry as fed into the static dewaterer and downstream as related to the amount of water that should be desirably left in the crumb on leaving the dewaterer.

An an example of the operation of the dewatering device of this invention, the following example is offered. An aqueous slurry of rubber crumb at a temperature of about 200° F. (93° C.) and containing 7.0 percent by weight of rubber is fed to the static dewatering device of this invention at a rate of approximately 13,700 gallons per hour (0.023 m$^3$/s). The bar-type screen which has openings equivalent to 12 mesh screen (U.S. Standard) has a total face area of about 0.73 m$^2$. The rubber crumb effluent contains only 45 percent moisture corresponding to 91.5 percent water removal. Rubber fines loss to the filtrate is less than 0.5 percent of the rubber feed.

We claim:

1. An apparatus for dewatering rubber crumb slurry, said apparatus comprising:
    (a) a concave surfaced screen sloping downward and attached to
    (b) a chute leading away from the screen;
    (c) a collecting vessel depended beneath the screen in a manner to collect material passed through the screen;
    (d) a means for directing an inlet feedstream downward toward said screen; and
    (e) means for controlling direction and amount of slurry flow comprising:
        (1) a first baffle fixed in relation to the inlet line and the screen to direct inlet flow away from the screen toward the face of
        (2) an adjustable second baffle, downstream of said first baffle, with
        (3) means for adjustment of said second baffle both to redirect slurry flow from the first baffle onto the screen and to limit the spacing between the screen and the second baffle thereby restricting slurry flow from the screen surface onto the chute.

2. An apparatus of claim 1 wherein said screen is a bar-type screen.

3. An apparatus of claim 1 wherein said chute comprises a surface coated with polytetrafluoroethylene.

4. An apparatus of claim 1 wherein said screen, chute, and baffles are contained within a housing.

5. An apparatus of claim 4 wherein said housing also contains an inlet means for crumb slurry and a means for collecting and removing material that has passed through the screen.

6. An apparatus of claim 5 wherein said inlet means comprises a head tank positioned above the static screen, said head tank comprising a weired chamber with inlet means upstream of the weir and overflow directed against the first baffle.

7. An apparatus of claim 1 wherein said second baffle is hung vertically and pivoted at its top with means for adjusting and locking the angle of the baffle.

8. A method for removing water from water crumb slurry, said method comprising directing said slurry downward toward a concave surfaced screen onto means for controlling direction and amount of slurry flow comprising:
    (1) a fixed baffle directing the slurry flow away from the screen toward the face of
    (2) a second baffle, said second baffle being adjustable, adjusting said second baffle to redirect the slurry flow onto the screen and to limit the spacing between the screen and the second baffle thereby restricting slurry flow along the screen surface, while controlling the amount of water from said slurry which passes through said screen.

* * * * *